UNITED STATES PATENT OFFICE.

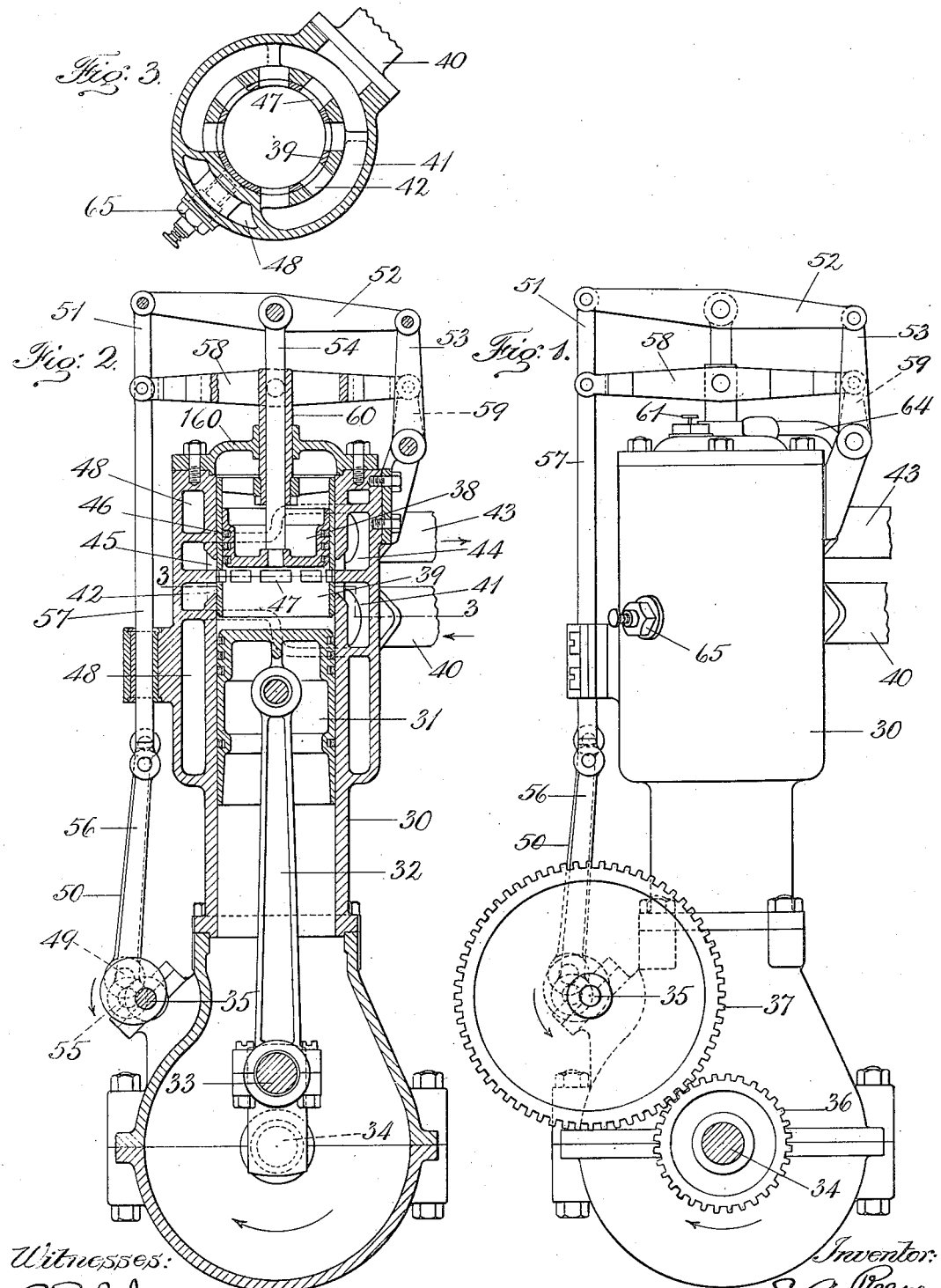

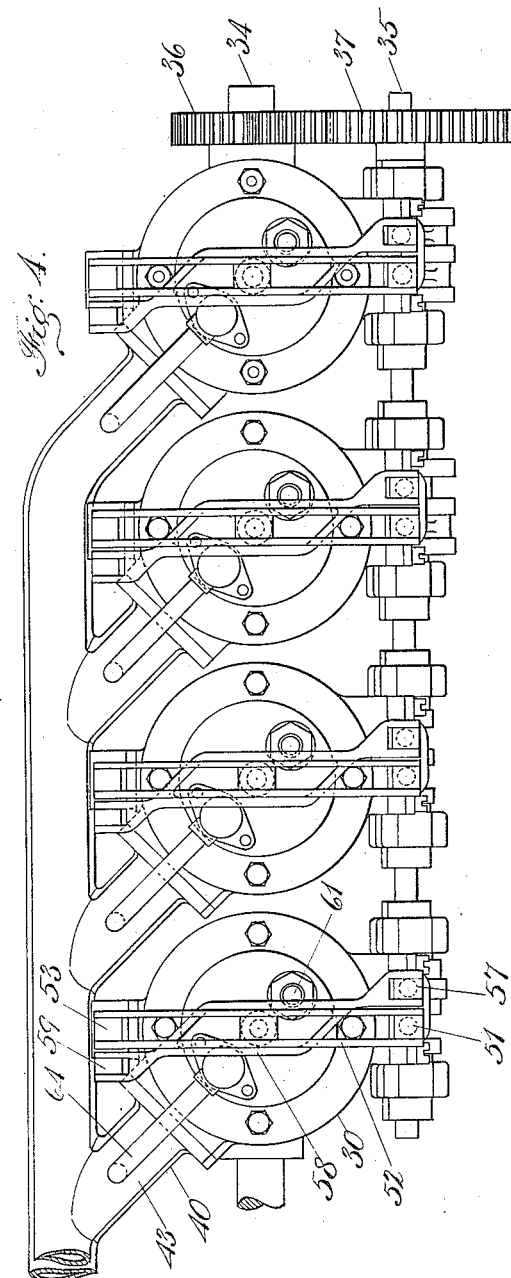
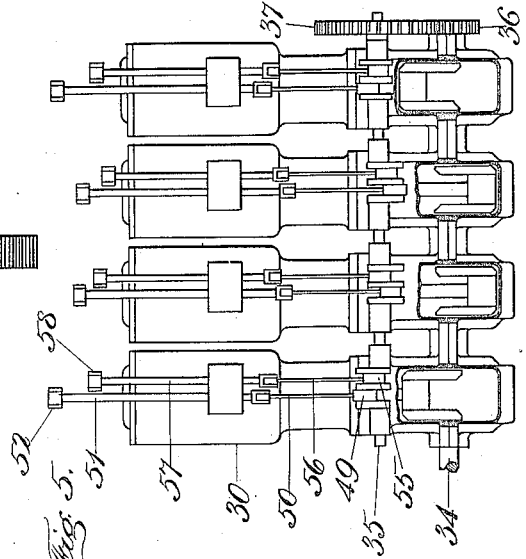
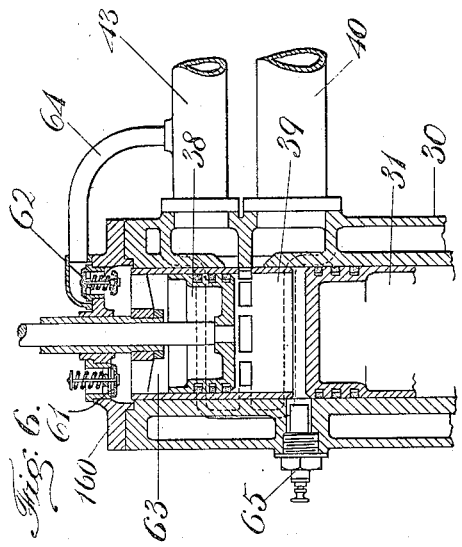

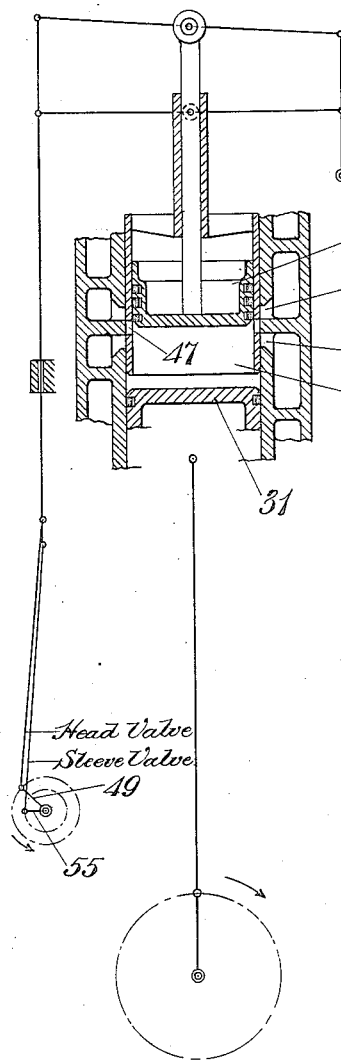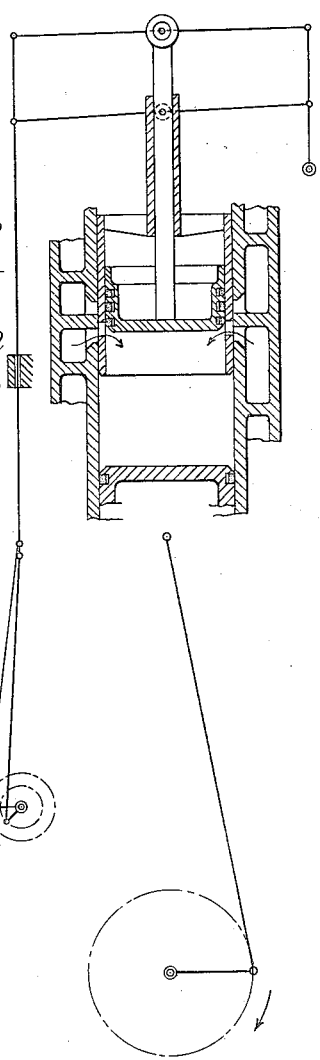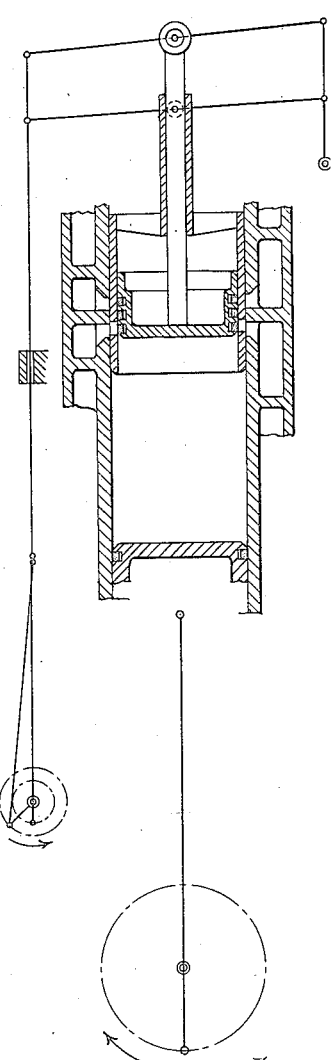

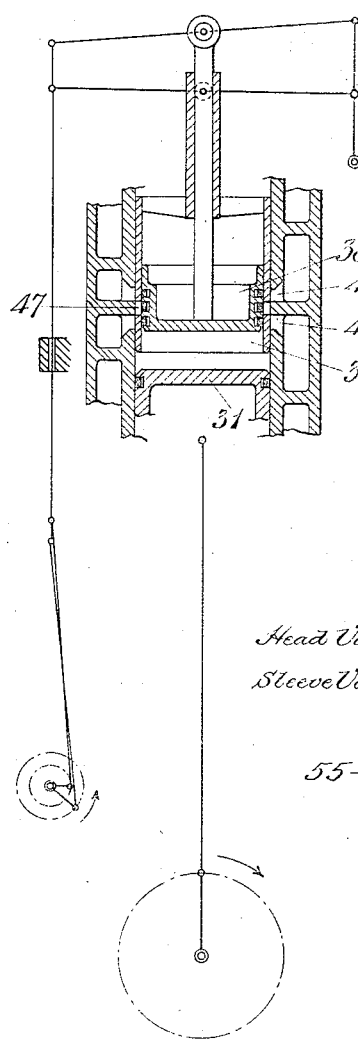
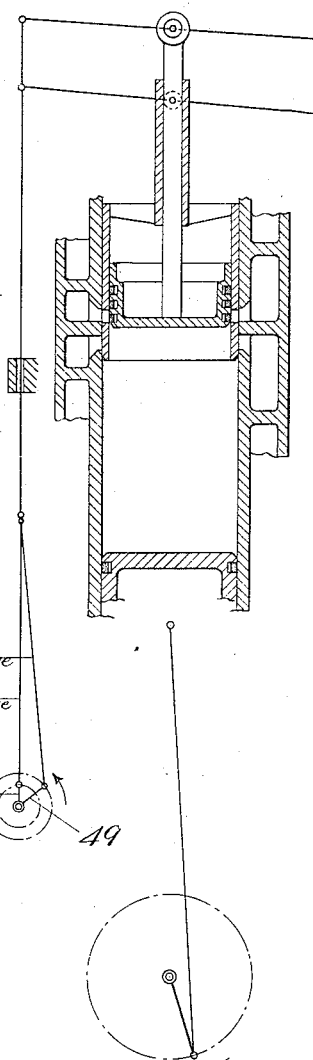
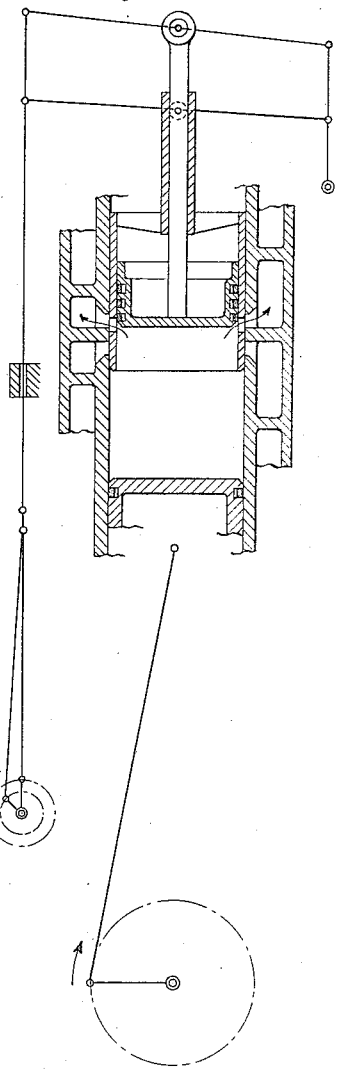

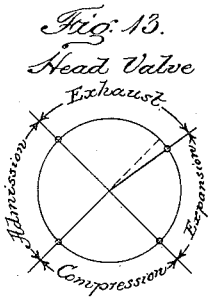
Fig. 13.
Head Valve
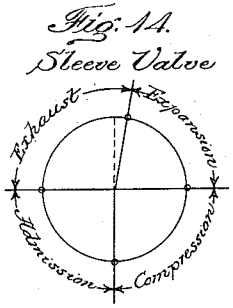
Fig. 14.
Sleeve Valve
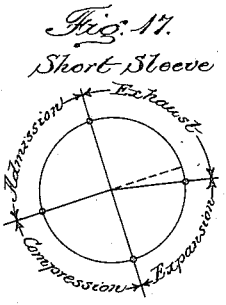
Fig. 17.
Short Sleeve
Fig. 18.
Long Sleeve
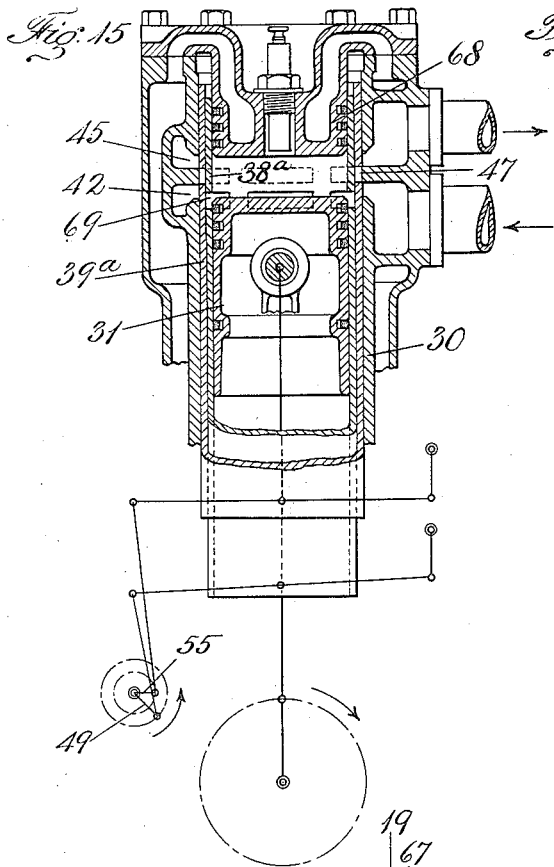
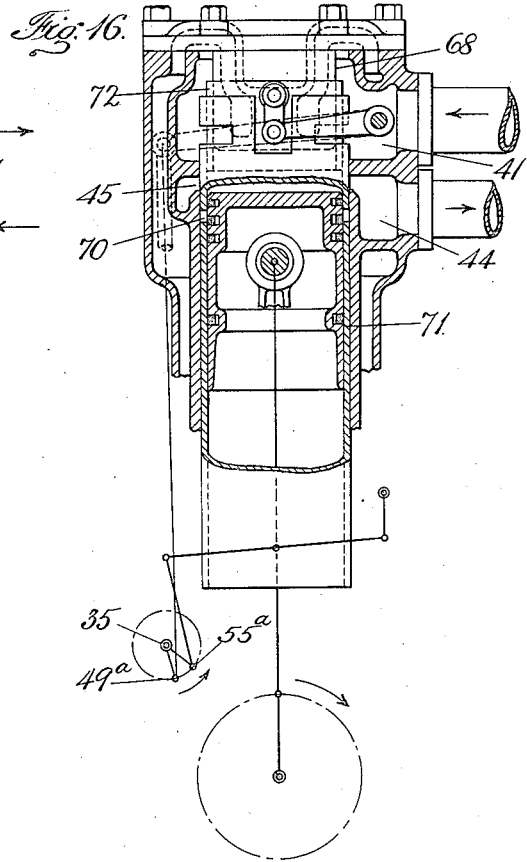
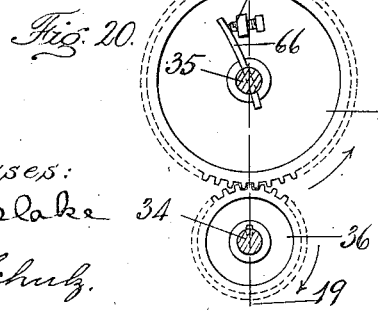
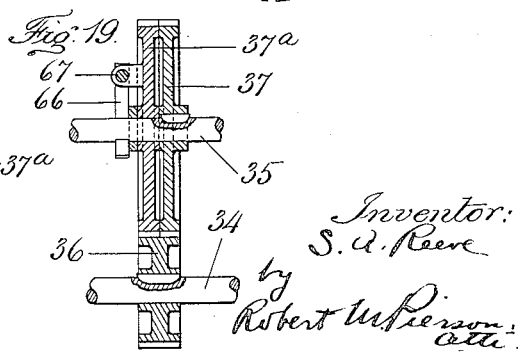

SIDNEY A. REEVE, OF NEW HAVEN, CONNECTICUT, ASSIGNOR, BY MESNE ASSIGNMENTS, TO CHARLES W. BROWN, TRUSTEE, OF PITTSBURGH, PENNSYLVANIA.

INTERNAL-COMBUSTION ENGINE.

1,169,353.  Specification of Letters Patent.  Patented Jan. 25, 1916.

Application filed June 10, 1909. Serial No. 501,262.

*To all whom it may concern:*

Be it known that I, SIDNEY A. REEVE, a citizen of the United States, residing at New Haven, in the county of New Haven and State of Connecticut, have invented certain new and useful Improvements in Internal-Combustion Engines, of which the following is a specification.

This invention relates to explosion engines, mainly those of the four-cycle type, employing cylindrical slide-valves.

My principal objects are, to increase the proportion of the cylinder circumference available for the location of admission and exhaust ports, to provide for the development of power from the valves themselves, to decrease the necessary length and weight of the valves, and to increase the facility of assembling and removing them. These objects are accomplished in the mechanism which I shall now describe in detail.

Of the accompanying drawings, Figure 1 represents an end elevation of a vertical four-cycle motor constructed according to my invention. Fig. 2 represents a vertical section thereof. Fig. 3 represents a horizontal section on the line 3—3 of Fig. 2. Fig. 4 represents a top plan view showing a four-cylinder arrangement of the motor. Fig. 5 represents a side elevation of the four-cylinder motor, partly in section. Fig. 6 represents a vertical section of the cylinder-head taken in the plane of the admission and exhaust pipes. Figs. 7–12, inclusive, represent diagrammatic sectional views illustrating the valve motion. Figs. 13 and 14 are circular diagrams for the motions of the respective valves. Fig. 15 represents a vertical section showing a modification in which both valves are of the sleeve type and balanced against endwise fluid pressure. Fig. 16 represents a similar view of another modification in which both valves are sleeves and one of them is balanced against endwise fluid pressure. Figs. 17 and 18 are circular diagrams showing the motions of the respective valves for the modification in Fig. 16. Fig. 19 is a section showing a form of gearing which may be employed to connect the crank-shaft and half-speed shaft when the number of cylinders is less than enough to develop continuous power from the valves. Fig. 20 represents an end view of this gearing.

Referring at first to Figs. 1–14 inclusive, 30 represents the engine cylinder, 31 the trunk piston therein, 32 the connecting-rod, 33 the crank, 34 the crank-shaft, and 35 the half-speed shaft driven from the crank-shaft by gearing 36, 37. Spur gears are shown but the invention is not restricted thereto. The valves, two in number, are preferably mounted above the piston and driven through the head end of the cylinder, 38 being a reciprocating plug or piston valve which I term the "head-valve," and 39 being a reciprocating sleeve valve mounted to slide in an extension of the cylinder-bore between the valve 38 and the cylinder-casing. These valves may be of any desired diameter relative to that of the cylinder. 40 is the inlet pipe extended to form a corridor 41 within the cylinder casting terminating in a belt of one or more admission ports 42 which may occupy substantially the entire circumference of the cylinder, and 43, 44, 45 are a similar pipe, corridor, and ports for the exhaust, located above the admission ports. The head-valve 38 is provided with suitable packing-rings 46 and the sleeve-valve 39 is formed with a belt of ports 47 adapted to register alternately with the stationary admission ports 42 and exhaust ports 45. 48 is a water jacket surrounding the cylinder. 49 is the pin of a short crank formed on the half-speed shaft 35 and connected with the head-valve 38 by a pitman 50, slide-rod 51, rock-lever 52 having a fulcrum-link 53, and valve-stem 54. 55 is the pin of a second crank of shorter throw formed on the half-speed shaft 35 about forty-five degrees in advance of the crank-pin 49 and connected with the sleeve-valve 39 by a pitman 56, slide-rod 57, rock-lever 58 having fulcrum-link 59, and hollow valve-stem 60 surrounding the head-valve stem 54. Both valves are removable and replaceable through the head end of the cylinder and the valve-stems are guided in a cylinder cover 160 provided with inlet and outlet air-ports controlled by spring check-valves 61, 62 (Fig. 6) for pumping air through the chamber 63 above the valves, by the motion of said valves, to cool the valves, and discharging it through a pipe 64 into the exhaust-pipe 43. I may of course omit this provision for forced air-cooling and leave the cylinder-head open or may otherwise cool the tops of the valves. 65 is a spark-plug entering the cylinder in the untraveled zone of the combustion-chamber between the main piston and the lower end of the sleeve-valve, as best seen in Fig. 6.

The preferred motions of the valves are represented in the diagrams, Figs. 7-14 inclusive. At the time admission begins (Fig. 7) both valves are on their downward stroke and the sleeve-valve ports 47 are below the piston-valve 38 and half-way between the exhaust-ports 45 and the admission-ports 42, without lap. Fig. 8 shows the admission wide open, both valves being still descending. At the beginning of compression (Fig. 9) the sleeve-valve has reached the bottom of its stroke and the head-valve has overtaken and covered the sleeve-valve ports. (The point at which admission and exhaust should begin with reference to the stroke of the main piston depends upon conditions, and it is obviously within the choice of the designer to arrange these valves, in a high-speed engine for example, so that the admission remains open during the first part of the piston compression stroke according to well-known practice.) At the moment of explosion (Fig. 10) the valves are both on their upward movement and the head-valve has its greatest overlap on the ports of the sleeve-valve. Fig. 11 shows the valves at the beginning of exhaust with the sleeve-valve ports at the top of their stroke in register with the cylinder exhaust ports and the head-valve about to uncover the sleeve-valve ports. During the exhaust-stroke (Fig. 12) the sleeve-valve starts to move downwardly and the head-valve attains its highest position, whereupon the valves again reach the position shown in Fig. 7 and the cycle is repeated.

It will be observed that during a part of the compression stroke and all of the expansion stroke both valves are moving outwardly and enlarging the cylinder space. They therefore develop power of their own since their inner end-faces are exposed to the unbalanced pressure in the cylinder operating in a direction axial to the valves, and this power may be equal to or in excess of that required to overcome the friction of the valves and of their connections with the crank-shaft. If the power thus developed is merely equal to that required to overcome friction there will be no exchange of power through the gears 36, 37 during an expansion stroke, said gears acting simply as synchronizers, and in an arrangement of four or more cylinders (see Figs. 4 and 5) having symmetrical power strokes, the positive torque upon the half-speed shaft 35 will be practically continuous. The valves or either of them may of course develop more than enough power to overcome friction and impart it to the crank-shaft 34 through the gears or other suitable driving connection. For convenience I speak of the valves in this embodiment as being "driven" by way of the head end of the cylinder, although on one stroke they act as drivers.

By using a lever 52 or 58 having the connection to the valve-stem and the connection to the pitman both located on the same side of the lever fulcrum, the advantage is secured of placing the connections to the half-speed shaft in tension and also when the pitman "arm" of the lever is the longer, of decreasing friction on the half-speed crank by making its stroke greater than that of the valve. The term "cranks" used in reference to the off-sets of the half-speed shaft of course also includes eccentrics.

Where the number of cylinders in the motor is insufficient to afford continuous positive torque upon the half-speed shaft, the alternations of positive and negative torque would tend to cause a back-lash of the gears, for the elimination of which I provide the arrangement shown in Figs. 19 and 20, wherein the small gear 36 keyed on the crank-shaft 34 meshes with a pair of large gears 37, 37$^a$ placed together on the half-speed shaft 35, the gear 37 being keyed on the shaft, while the gear 37$^a$ is loose thereon and yieldingly connected with gear 37 by means of a leaf spring 66 on shaft 35 engaging an adjustable contact-screw 67 on the loose wheel 37$^a$.

It should be noted that the motion of my two axially unbalanced slide-valves 38 and 39 is so timed that their combined displacement of cylinder contents is the greatest virtually at the end of the exhaust stroke of the working piston 31. In connection with the above, the combined effect of the piston and the two valves upon the volume of the cylinder space may be made clearer by the following numerical illustration: If the said displacement of the working piston 31 be 100 units of volume; that of the head-valve 38 be 20 units; and that of the sleeve-valve 39 be 6 units, then, at each end of the stroke of the working piston 31 the crank driving the head-valve 38 will be at an angle of about 45° with the axis of the engine and the crank of the sleeve-valve 39 at about 0°, 90°, or 180°. The consequent displacement of the head-valve 38 will be either 3 units or 17 units and that of the sleeve-valve 39 will be 0 units, 3 units or 6 units. Combining these volumes according to Figs. 7 to 12 inclusive to get the net effective cylinder-volume at each dead-center of the cycle, there results the following comparison, allowing a clearance space of 18 units in order to control the ratio of compression:—

| Epoch. | Elts. | Cyl. vol. | Lgth. stroke. | Ratios. |
|---|---|---|---|---|
| Start adms.: | 0+17+3+18= 38 | | 83 | |
| End " | 100+ 3+0+18=121 | | 97 | Comp. 5.04 |
| " comp.: | 0+ 3+3+18= 24 | | 117 | Expn. 5.87 |
| " expn.: | 100+17+6+18=141 | | 103 | |
| " exst.: | 0+17+3+18= 38 | | | |

In the modified arrangement of Fig. 15 both valves 38ª and 39ª are in the form of sleeves driven from their lower ends and hence passing between the piston 31 and the wall of cylinder 30, their upper ends working between the cylinder wall and a fixed cylinder-head 68, the valves being thereby balanced against cylinder pressures. I make no claim to this mode of driving and balancing the valves, but it will be noted that the arrangement of Fig. 15 retains the advantages of valve timing and ability to utilize substantially the entire cylinder circumference for each zone of stationary ports, characteristic of Figs. 1–12, there being provided ports 69 in the inner sleeve 38ª whose upper lips are equivalent to the lower cut-off lip of the head-valve 38 in the first-described arrangement.

In the second modification, Fig. 16, I transpose the positions of the admission and exhaust corridors 41, 44, placing the former above the latter, and provide a somewhat different valve-motion and arrangement of valves. In this case the stationary exhaust-ports 45 are solely controlled by the upper lips of a circle of ports 70 in an outer sleeve-valve 71 driven from its lower end, and the admission is controlled by the joint action of the upper portion of sleeve-valve 71 and a short sleeve-valve 72 working on the inside of valve 71, between it and the stationary cylinder-head 68, and driven by suitable connections from the half-speed shaft 35. 49ª denotes the crank-pin for driving the short sleeve 72 and 55ª the crank-pin for driving the long sleeve 71. In the diagrams, Figs. 17 and 18, for this valve-motion, the radial lines indicate the positions of the half-speed cranks for the respective valves between the four phases as marked on the diagrams, and it will be evident that Fig. 16 represents the positions occupied by the valves at the moment of explosion. The same valve-motion could obviously be applied to an arrangement in which the valve 72 is a plug or piston, like the valve 38 in Figs. 1–12; and various other modifications, and combinations of the valves and valve-motions herein disclosed, not all of them necessarily involving the two zones of cylinder ports, could be made without departing from my invention.

I claim:

1. In a four-cycle explosion motor, the combination of a cylinder having belts of admission and exhaust ports each extending more than half-way around the combustion-chamber, and a pair of longitudinally-reciprocating cylindrical half-speed slide-valves working one within the other and controlling said ports.

2. In a four-cycle explosion motor the combination of a cylinder having belts of admission and exhaust ports adjacent in an axial direction, and a pair of cylindrical half-speed slide-valves controlling said ports and reciprocated in line with the cylinder bore.

3. In a four-cycle explosion motor, the combination with the cylinder and working piston, of a pair of axially-reciprocating half-speed slide-valves alined with the cylinder bore, one of which is a sleeve-valve and the other an axially-unbalanced plug or piston valve working within the sleeve-valve.

4. In a four-cycle explosion motor, the combination with the cylinder and working piston, of a pair of unbalanced slide-valves controlling the admission and exhaust of said cylinder, reciprocating axially of said cylinder and arranged concentric with each other, and means for employing the outward movement of said slide-valves in the development of power.

5. In a four-cycle explosion motor, the combination with the cylinder and working piston, of a pair of unbalanced slide-valves controlling the admission and exhaust of said cylinder, reciprocating axially of said cylinder and arranged concentric with each other, and half-speed connections for driving one of said valves comprising a stem extending from said valve through the head end of the cylinder.

6. In a four-cycle explosion motor, the combination with the cylinder and working piston, of a pair of axially-reciprocating half-speed slide-valves controlling the admission and exhaust thereof, one being a sleeve alined with the cylinder bore and the other being a plug or piston valve mounted within said sleeve and driven by a stem extending from said valve through the head end of the cylinder.

7. In a four-cycle explosion motor, the combination with the working cylinder and piston, of a pair of concentric axially-movable and axially-unbalanced slide-valves mounted in the head end of the cylinder in line with the piston and controlling the admission and exhaust of said cylinder, and means for driving said valves at half-speed comprising connections extending from said valves through the head end of the cylinder.

8. In a four-cycle explosion motor, the combination with the working piston, of a cylinder having an exhaust port, and an admission port in a different zone located between the exhaust port and the zone traveled by the piston, and a pair of axially-reciprocating cylindrical half-speed slide-valves mounted in line with the cylinder bore and controlling said ports.

9. In a four-cycle explosion motor, the combination with the working piston, of a cylinder having an exhaust port, and an admission port in a different zone located between the exhaust port and the zone traveled by the piston, and a pair of concentric axially-reciprocating coöperative valves mounted one within the other in line with the cylinder bore and controlling said ports.

10. In a four-cycle explosion motor, the combination of a plurality of cylinders and working pistons therefor having a common driving connection, a pair of axially unbalanced coöperating half speed slide valves for each of said cylinders, and a driving connection for said valves, the cylinders being in number and relation of phases such that the valve-driving connection receives substantially continuous positive torque from the valves.

11. In a four-cycle explosion motor, the combination of cylinders, at least four in number, and their working pistons connected to a common crank-shaft, a half-speed shaft connected with said crank-shaft and having cranks disposed at different angles so as to give symmetrical successive phases in the several cylinders, and a pair of axially unbalanced coöperating half speed slide valves for each of said cylinders and connected with said half-speed cranks.

12. In a four-cycle explosion motor, the combination with the cylinder, the working piston and the crank-shaft, of an axially-unbalanced slide-valve for said cylinder, a half-speed shaft connected with the crank-shaft and having a valve-crank, and a driving connection from the valve to the valve-crank including a pitman, and a lever having connection with said pitman and said valve on the same side of the lever-fulcrum.

13. In a four-cycle explosive motor, the combination with the cylinder, the working piston, and the crank-shaft, of a half-speed shaft connected with said crank-shaft and having a pair of cranks, a pair of concentric axially-unbalanced slide-valves controlling the admission and exhaust of said cylinder, one of said slide-valves having the same external diameter as said working piston, and driving connections extending from said valves through the head end of the cylinder to the half-speed cranks.

14. In a four-cycle explosive motor, the combination with the cylinder, the working piston, and the crank-shaft, of a half-speed shaft connected with said crank-shaft and having a pair of cranks, a pair of concentric axially-unbalanced slide-valves controlling the admission and exhaust of said cylinder, one of said slide-valves having the same external diameter as said working piston, and driving connections extending from said valves through the head end of the cylinder to the half-speed cranks and including levers and tension pitman-rods.

15. In a four-cycle explosion-motor, the combination with the cylinder, working piston and crank-shaft, of a half-speed shaft having two cranks, and two axially unbalanced coöperating slide-valves connected thereto, both such valves moving in such direction as to derive power from the cylinder-fluids.

16. In a four-cycle explosion-motor, the combination of cylinder, working piston and shaft, of a sleeve slide valve; a piston slide valve working in said sleeve slide valve, a half speed shaft driving said slide-valves by means of two cranks so timed as to make the effective phase of one slide-valve virtually one quadrant of half-speed-shaft motion from that of the other.

17. In a four-cycle explosion-motor, the combination with cylinder, working piston and shaft, of a half-speed shaft, two axially unbalanced concentric slide-valves driven therefrom, the motion of the valves being so timed that their combined displacement is the greatest virtually at the end of the exhaust-stroke of the working-piston.

In testimony whereof I have hereunto set my hand in the presence of two subscribing witnesses, this ninth day of June, 1909.

SIDNEY A. REEVE.

Witnesses:
AUGUSTUS E. PORTER,
ELTON T. PERKINS.